United States Patent
Müller et al.

(10) Patent No.: US 11,835,332 B2
(45) Date of Patent: Dec. 5, 2023

(54) DEVICE AND METHOD FOR DETECTING THE STEERING WHEEL POSITION, THE STEERING WHEEL ANGLE AND THE INCLINATION OF THE STEERING WHEEL OF A VEHICLE

(71) Applicant: DÜRR Assembly Products GmbH, Saarbrücken (DE)

(72) Inventors: Stefan Müller, Illingen (DE); Rainer Weisgerber, Saarwellingen (DE); Ismail Kurt, Völklingen (DE); Thomas Tentrup, Merzig-Mechern (DE)

(73) Assignee: DURR ASSEMBLY PRODUCTS GMBH, Puttlingen (DE)

( * ) Notice: Subject to any disclaimer, the term of this patent is extended or adjusted under 35 U.S.C. 154(b) by 1080 days.

(21) Appl. No.: 16/338,138

(22) PCT Filed: Sep. 29, 2017

(86) PCT No.: PCT/DE2017/100835
§ 371 (c)(1),
(2) Date: Mar. 29, 2019

(87) PCT Pub. No.: WO2018/059628
PCT Pub. Date: Apr. 5, 2018

(65) Prior Publication Data
US 2021/0293534 A1    Sep. 23, 2021

(30) Foreign Application Priority Data
Sep. 30, 2016 (DE) ..................... 10 2016 118 593.0

(51) Int. Cl.
| | | |
|---|---|---|
| G01B 11/26 | (2006.01) | |
| G01C 9/06 | (2006.01) | |
| G01M 17/06 | (2006.01) | |

(52) U.S. Cl.
CPC ................ G01B 11/26 (2013.01); G01C 9/06 (2013.01); G01M 17/06 (2013.01); *G01C 2009/066* (2013.01)

(58) Field of Classification Search
CPC ..... G01B 11/26; G01C 9/06; G01C 2009/066
(Continued)

(56) References Cited

U.S. PATENT DOCUMENTS

| | | | | |
|---|---|---|---|---|
| 4,893,413 A | * | 1/1990 | Merrill ................... | B62D 17/00 D10/69 |
| 8,451,109 B1 | * | 5/2013 | Daniel ................... | B62D 1/046 340/576 |

(Continued)

FOREIGN PATENT DOCUMENTS

| | | |
|---|---|---|
| DE | 102010054222 A1 | 8/2011 |
| DE | 202012001027 U1 | 3/2012 |

(Continued)

*Primary Examiner* — Michael A Lyons
*Assistant Examiner* — Omar H Nixon
(74) *Attorney, Agent, or Firm* — Gregory D. Degrazia; MILLER, CANFIELD, PADDOCK AND STONE

(57) ABSTRACT

A device for detecting a steering wheel position, the steering wheel angle and/or the inclination of the steering wheel (304) of a vehicle is disclosed. The device includes at least two cameras (5, 6; 202, 203) by means of which the steering wheel (304) can be sensed (8, 9; 204, 205). At least three reference objects (301, 302, 303) are provided which can be releasably fastened to the steering wheel (304).

8 Claims, 2 Drawing Sheets

(58) Field of Classification Search
USPC .......................................................... 356/139
See application file for complete search history.

(56) References Cited

U.S. PATENT DOCUMENTS

| | | | | |
|---|---|---|---|---|
| 2006/0227211 | A1* | 10/2006 | Kotake | G06T 7/73 |
| | | | | 348/169 |
| 2013/0227848 | A1 | 9/2013 | Wilds et al. | |
| 2014/0219509 | A1 | 8/2014 | Buzzi et al. | |
| 2015/0317527 | A1 | 11/2015 | Graumann et al. | |
| 2016/0086391 | A1* | 3/2016 | Ricci | G06Q 30/06 |
| | | | | 701/29.3 |
| 2016/0247394 | A1* | 8/2016 | Stenneth | G07C 5/0808 |
| 2016/0377508 | A1* | 12/2016 | Perrone | B60W 10/184 |
| | | | | 180/204 |
| 2017/0115730 | A1* | 4/2017 | Knebel | G06F 3/005 |
| 2017/0166235 | A1* | 6/2017 | Walker | H04M 1/72412 |
| 2017/0199102 | A1* | 7/2017 | Badiru | B62D 65/00 |
| 2018/0022292 | A1* | 1/2018 | Lowell | B60R 11/02 |
| | | | | 224/276 |

FOREIGN PATENT DOCUMENTS

| | | |
|---|---|---|
| DE | 102012025530 A1 | 6/2014 |
| JP | 2009090687 A | 4/2009 |

\* cited by examiner

DEVICE AND METHOD FOR DETECTING THE STEERING WHEEL POSITION, THE STEERING WHEEL ANGLE AND THE INCLINATION OF THE STEERING WHEEL OF A VEHICLE

PRIOR APPLICATIONS

The present application is a national filing claiming priority to International Patent Application No. PCT/DE2017/100835 filed on Sep. 29, 2017, which claims priority to German Patent Application No. 102016118593 filed on Sep. 30, 2016.

TECHNICAL FIELD

The present invention relates to a device for detecting the steering wheel position, the steering wheel angle and the inclination of the steering wheel of a vehicle according to the preamble of claim 1.

BACKGROUND

A steering wheel balance for measuring the orientation of the steering wheel of a motor vehicle with respect to the horizontal is known from DE 10 2005 042 446 B3. Said steering wheel balance comprises means for releasably fastening the steering wheel balance to the steering wheel in the symmetry position thereof, and a variably adjustable support device for fixing the steering wheel balance to the body of the vehicle. Furthermore, an inclinometer is provided for detecting the deviation from the horizontal. Moreover, a force measurement is carried out in the releasable fastenings on the steering wheel in order to measure torques between the steering wheel balance and the steering wheel. In this case, the steering wheel balance is used so that, in a method for setting the individual toe angle of the front axle of a motor vehicle, the steering wheel is adjusted such that the steering wheel is oriented so as to be horizontal with respect to the symmetry position thereof, during straight travel of the motor vehicle.

JP 2009 090687 A discloses device, in which a vehicle is equipped with a steering mechanism in accordance with the "steer-by-wire" principle. A steering angle sensor, which is known per se, is provided, which measures the steering wheel angle at the steering column, in order to detect a steering wheel angle of the steering wheel on the basis of a neutral position. In order to have a redundant measuring device for the steering angle in the case of a malfunction of the steering wheel sensor, an infrared camera is used, which is attached on the upper side of the steering column with a detection angle for sensing the facial features of the vehicle driver, in order to check the driver's attention and output warning signals in a lack of attention, if required. For this purpose, a reference object is fastened at the side of the steering wheel rim that faces the infrared camera, and which can be sensed by the infrared camera. Based upon this positional change of this reference object, the steering wheel angle is concluded through an evaluation of the image of the infrared camera. Due to the fact that the infrared camera can sense only a reference object on the upper part of the steering wheel rim due to the mounting position, another reference object is fastened at the circumference of the steering wheel rim, which can be optically differentiated from the first reference object. Thus, it becomes possible to conclude a steering wheel angle even if the steering wheel has been turned so far that the steering wheel rim is in a position where the first reference object is turned to the bottom, i.e. out of the detection region of the infrared camera. Advantageously, the further reference object is situated in the detection range of the infrared camera. Since the tow reference object can be discriminated, the steering wheel angle can be concluded.

US 2014/219509 A1 describes the provision of three-dimensional measuring systems, in order to measure parameters of the vehicle geometry in a highly-precise manner. For this purpose, the coordinates of the measuring system must be known with such a precision. In order to measure these measuring systems repeatedly in terms of their position, targets are provided, the positions of which are known. The position in turn can be concluded from the measuring of the targets by the measuring systems.

DE 10 2012 025 530 A1 relates to a device for detecting the steering wheel position in the sense of the steering wheel angle. The steering wheel angle can also be detected and evaluated by means of a camera.

SUMMARY

The object of the present invention is that of simplifying the detection of the steering wheel angle, the steering wheel position and/or the inclination of the steering wheel.

This object is achieved, according to the present invention, in accordance with claim 1, by a device for detecting the steering wheel position, the steering wheel angle and the inclination of the steering wheel of a vehicle that comprises at least two cameras, each of which can sense the steering wheel of the vehicle. The device furthermore comprises at least three reference objects which can be releasably fastened to the steering wheel.

The steering wheel can be sensed using the two cameras when the solid angle of the image plane is oriented such that the steering wheel is included by said solid angle in each case. That is to say that the two cameras must be oriented such that the steering wheel is respectively located in the image region of the camera.

This arrangement makes it possible to determine the position of the three reference objects in space using the two cameras. The plane in which said three reference objects are located is defined by the position of said three reference objects in space. As a result, the plane of the steering wheel is also defined, because the reference objects are clearly fastened to the steering wheel relative to said steering wheel plane.

In this case, it is found to be advantageous for evaluation if the three reference objects span a plane that is identical to the plane of the steering wheel or in parallel with the plane of the steering wheel. If the three reference objects span a plane which is defined, relative to the plane of the steering wheel, but extends obliquely to the plane of the steering wheel, marginal information then has to be known that makes it possible to determine steering wheel plane from the plane spanned by the reference objects. Said marginal information relates for example to the geometric arrangement of the reference objects with respect to one another, and/or the vertical spacings of each individual reference objects from the steering wheel plane.

In general, for common evaluation and three-dimensional measurement of the at least three reference objects, the at least two cameras must have a common reference system. The position of the at least three reference objects in space is then determined in the common reference system of the at least two cameras. If the vehicle is in a vehicle test bench, it is particularly advantageous for the common reference system of the at least two cameras to be calibrated to the coordinate system of the test bench. In test benches of this kind, the parameters of the vehicle geometry are measured. This relates in particular also to the toe and camber angles of the wheels of the vehicle. In this connection, it is found to be particularly advantageous for the measuring units for detecting the parameters of the vehicle geometry, and the at least two cameras according to the device according to the present invention, to be calibrated to the same coordinate system.

This calibration is usually carried out using a calibration gauge of the test bench.

In the embodiment of the device according to claim 2, in the releasable fastening, two of the at least three reference objects are in each case arranged in the region of the upper transition of a crosspiece in the steering wheel to the steering wheel rim, wherein one of said two reference objects can be fastened on the left-hand side of the crosspiece and the other of said two reference objects can be fastened on the right-hand side of the crosspiece, wherein said two reference objects can be distinguished from the at least one further reference object.

This embodiment of the device advantageously makes use of the fact that steering wheels generally comprise a crosspiece by means of which the steering wheel rim is fastened to the central shaft of the steering wheel. Above said crosspiece, the steering wheel is generally open towards the steering wheel rim. This makes it possible for the vehicle driver to keep the display elements, in the instrument cluster of the dashboard, in view in the event of a "straight position" of the steering wheel or a small steering wheel angle. The steering wheels optionally also have a connection element, from the central shaft of the steering wheel downwards towards the steering wheel rim.

In this case, attachment of the reference objects in the region of the upper transition of a crosspiece in the steering wheel to the steering wheel rim in each case, means that said reference objects may be arranged directly at the transition or so as to be at a defined spacing from the transition and at a defined direction relative to said transition. As a result, the reference objects can for example also be fastened to a frame or a carrier that is inserted into the steering wheel, and in the process is braced by the two upper transitions of a crosspiece in the steering wheel to the steering wheel rim.

In the embodiment according to claim 2, it is advantageously the case that the two reference objects are each attached at a defined point of the steering wheel. Furthermore, in the case of conventional steering wheels said two points are axisymmetric with respect to a center line in the steering wheel plane, which line extends through the center point of the steering wheel, in the vertical direction (i.e. from the lowest point of the steering wheel rim to the uppermost point of the steering wheel rim).

This means that, in the case of an optimally adjusted steering wheel, the connecting line of said two reference objects extends horizontally in the event of straight travel. The angle between the connecting line of the two reference objects and the intersection lines resulting between a horizontal plane and the steering wheel plane determined by all three reference objects is the steering wheel angle.

In order to detect the "correct" combination of the two reference objects, the connecting line of which extends horizontally in the event of straight travel, said two reference objects can advantageously be distinguished from the at least one further reference object. This possibility of distinction may result from said reference objects appearing different, in terms of shape, size and/or color, from the at least one further reference object. Said two reference objects can also be distinguished from the at least one further reference object by means of evaluating the spacing between the reference objects. In the case of the embodiment according to claim 2, the spacing between the two reference objects corresponds approximately to the diameter of the steering wheel rim, and is therefore without exception greater than the spacing between two other reference objects.

This makes it possible to determine whether the steering wheel angle corresponds to the target value thereof. The steering wheel angle corresponds to the target value thereof when the orientation of the connecting line of the two reference objects corresponds to a target value in the event of a steering angle of the wheels of the vehicle that corresponds to straight travel. Said target value generally corresponds to a horizontal course, but in some circumstances may also be a defined steering wheel angle.

The device can for example be used to indicate to a worker whether it is necessary to remove the steering wheel at all, and the direction in which, and optionally the amount by which, said worker should rotate the steering wheel when replacing it, in order for the condition of "straight position of the steering wheel" to be achieved. This takes place only to the extent that adjustment of the steering wheel by removal and replacement of the steering wheel is intended at all. This is the case only for lorries. A procedure of the kind is described for example in WO 2015/018396 A1.

Another known method for setting the steering wheel consists in setting the toe angles of the steerable wheels such that said angles exactly correspond, with respect to the steering wheel angle, to the current steering wheel position. In this case, the detected steering wheel position (steering wheel angle) is calculated into the target values of the individual toe angles of the steerable wheels. A deviation of the actual value from the target value can be indicated to the worker, so that said worker performs the corresponding setting of the individual toe angles.

In particular when setting the individual toe angles of the steerable wheels relative the steering wheel angle, it is essential for the measuring unit for detecting the steering wheel angle and the measuring unit(s) for detecting the individual toe angles to be calibrated to the same reference system. This applies both when readjusting the steering wheel and when setting the individual toe angles taking account of the steering wheel angle.

During an evaluation in conjunction with the third reference object, the plane of the steering wheel can be determined again.

In this case, it is possible to particularly advantageously take account of the fact that the steering wheel angle (and thus also the steering wheel position that corresponds to the "straight orientation") depends on the inclination of the steering wheel. If the third reference object is also evaluated therewith, this effect can also be taken into account.

In the embodiment according to claim 3, reference aids are provided which are arranged outside the periphery of the steering wheel. Said reference aids are in each case associated with one of the two reference objects, located in each case in the region of the upper transition from the crosspiece in the steering wheel to the steering wheel rim, such that the connecting line between the two reference aids coincides with or extends in parallel with the connecting line of the two reference objects mentioned.

This is found to be advantageous insofar as the possibility of evaluating the position of the two reference objects, which is described as advantageous in connection with claim 2, is also retained for the two reference aids.

Since the two reference aids are located further from one another than the two reference objects, the precision when evaluating the position of the connecting line relative to the horizontal is advantageously improved.

The reference aids can be attached for example in that the reference objects each comprise a receptacle for a connection element. A straight rod may furthermore be provided, on which rod the two reference aids are arranged, and two connection elements which may be adjustable in the longitudinal direction of the rod. If the connection elements are displaced along the rod such that the spacing of said elements corresponds to the spacing of the receptacles of the two reference objects, the rod, comprising the reference aids, can be placed on the reference objects. In this embodiment, the connecting line of the two reference aids extends in parallel with the connecting line of the reference objects.

In the embodiment according to claim 1, three reference objects are interconnected by means of a frame. The frame consists of three longitudinal elements that are interconnected, at a common center point, at one of the ends thereof. The reference objects are in each case resiliently fastened at the other end of the longitudinal elements, such that the reference objects can in this case be pushed in the longitudinal direction of the longitudinal elements.

This provides a simple possibility for achieving the releasable fastening of the three reference objects to the steering wheel. The reference objects can in addition also be shaped so as to be substantially cylindrical and so as to be mounted so as to be rotatable about the central axis of the cylinder. The lateral surface of the cylinder may correspond to the inner face of the inner portion of a torus that has been cut open in the manner of a circle.

Since the steering wheel rim is toroidal, a particular advantage of an embodiment of this kind is that the relevant reference object is in contact with the steering wheel rim at a defined position.

Even if the shape of the reference objects is less optimally adapted to the geometrical shape of the steering wheel rim, the resilient mounting results in the reference objects being pressed onto the steering wheel rim in a defined manner.

In the embodiment according to claim 4, the frame is designed such that the center point of the frame is located above the connecting line of the two bottom reference objects when the three reference objects are fastened to the steering wheel.

Geometrical constraints, resulting from the conventional design of steering wheels, can thus advantageously be taken into account. It is frequently the case in steering wheels that the crosspiece does not extend exactly horizontally, but instead that the crosspiece consists of two elements which extends obliquely downwards, proceeding from the center point of the steering wheel. It is furthermore often the case that the center point of the steering wheel is formed as a circle in which for example the actuation element for the horn is integrated. The width of the crosspiece is therefore often less than would correspond to the diameter of the circle of the steering wheel around the center point.

The described geometrical design and arrangement of the frame makes it possible to take account of this, but wherein the two corresponding reference objects can nonetheless each be arranged in the region of the upper transition of the crosspiece in the steering wheel to the steering wheel rim.

In this embodiment, the frame is advantageously spaced apart both from the crosspiece and from the circle around the center point of the steering wheel, such that the frame (and thus also the reference objects) can be easily assembled and detached again.

In the embodiment according to claim 5, the two cameras can be arranged on the same side of the vehicle, outside the vehicle.

It is found to be advantageous for a test bench for the cameras to be arranged outside the vehicle. This means that there is no loss of cycle time owing to the cameras first having to be moved, in the vehicle interior, to a defined position (for example through an open window).

If the two cameras are arranged on the same side of the vehicle, the necessary assembly space in the test bench is limited to this one side of the vehicle. The corresponding assembly space on the other side of the vehicle is then available for installing other equipment or as a space in which the worker can move unimpeded by installed measuring and evaluation equipment.

The two cameras can be designed such that each of the two cameras in each case has a solid angle that allows for a steering wheel to be detected by both cameras, both on the right-hand side of the vehicle and on the left-hand side of the vehicle.

In the case of an embodiment of this kind, both right-hand drive and left-hand drive vehicles can be measured in the test bench.

Claim 6 relates to an embodiment in which each of the two cameras in each case has a solid angle that allows for a steering wheel to be detected by both cameras, either on the right-hand side of the vehicle or on the left-hand side of the vehicle.

In contrast with the embodiment according to claim 5, this embodiment allows for the two cameras to be designed for use either for a right-hand drive vehicle or for a left-hand drive vehicle. The measuring accuracy can be increased thereby.

Firstly, the solid angle in which the cameras acquire an image is smaller.

Secondly, the cameras are aligned so as to be oriented less obliquely towards the plane in which the reference objects are to be detected. This is the case in particular when the two cameras are arranged on the left-hand side of the vehicle, for a left-hand drive vehicle, and on the right-hand side of the vehicle, for a right-hand drive vehicle.

In order to be able to measure both left-hand drive and right-hand drive vehicles using a measuring assembly of this kind, it is possible to arrange a camera assembly consisting of two cameras on the left-hand side of the vehicle, and to also arrange a further camera assembly of this kind on the right-hand side of the vehicle.

Alternatively to arranging two camera assemblies, it is also possible to provide just one camera assembly and to design said assembly such that the position thereof is movable, in order that said camera can be moved from a defined position and orientation on the left-hand side of the vehicle into a defined position and orientation on the right-hand side of the vehicle (and vice versa).

Claim 7 relates to an embodiment in which the two cameras are arranged on different sides of the vehicle. Each of the two cameras in each case has a solid angle that allows for a steering wheel to be detected by both cameras, both on the right-hand side of the vehicle and on the left-hand side of the vehicle.

This again makes it possible to measure both left-hand drive and right-hand drive vehicles using just one camera assembly.

Claim 8 relates to a method for detecting the steering wheel position, the steering wheel angle and the inclination of the steering wheel of a vehicle, in which the steering wheel is sensed using at least two cameras, the solid angle of which is oriented relative to the image plane such that the steering wheel is also included in said solid angle in each case, wherein the at least two cameras can detect at least three reference points on the steering wheel.

The reference points may be points on the steering wheel that are clearly defined by the position thereof on the steering wheel (or with respect to the steering wheel) and can be identified by the cameras at a sufficiently level of certainty and accuracy. It is thus not essential, in the method according to claim 8, to fasten reference objects to the steering wheel according to the procedure in device claims 1 to 7.

In this case, when a steering wheel angle of the vehicle corresponds to straight travel of the vehicle, two of said reference points are advantageously in a horizontal line, as is explained for the two reference objects, in connection with claim 2.

In this case, the arrangement of the cameras according to claims 5 to 7 can also be used in method claim 8.

In the following figures, the geometric ratios are explained in connection with the reference objects 301, 302, 303. It can clearly be seen that the same geometric ratios also apply for reference points that are defined in relation to the steering wheel.

In the embodiment according to claim 8, the three reference objects on the steering wheel have to be known. This means that the method can no longer be applied independently of the installed steering wheel. The reference points are dependent on the steering wheel geometry. Increased effort is therefore required in the evaluation in order to identify the steering wheel-specific features (identification of the reference points).

BRIEF DESCRIPTION OF THE DRAWINGS

An embodiment of the invention is shown in the drawings, in which.

DETAILED DESCRIPTION

Figure 1:
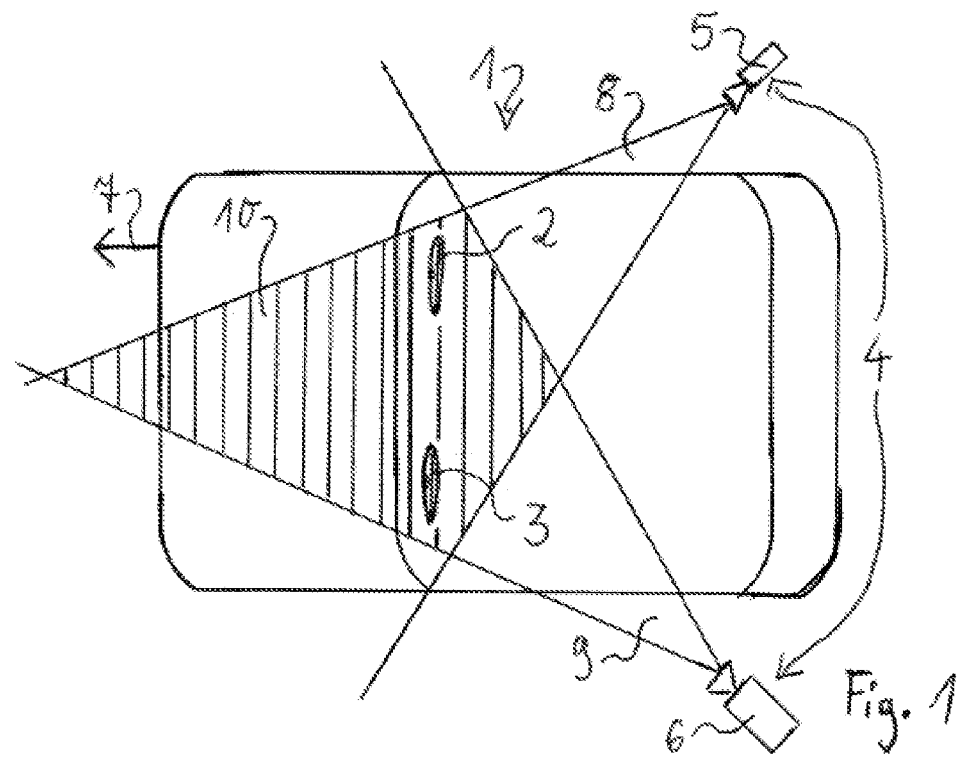
FIG. 1: is a plan view of a vehicle which is shown, in a schematic view, both as a right-hand drive and as a left-hand drive vehicle, comprising a first camera assembly.

FIG. 1 is a plan view of a vehicle 1 which is shown, in a schematic view, both with a steering wheel 2 at the right side (right-hand drive vehicle) and with a steering wheel 3 at the left vehicle side (left-hand drive vehicle), comprising a first camera assembly 4 that consists of a camera 5 on the right-hand side of the vehicle and a camera 6 on the left-hand side of the vehicle. The travel direction of the vehicle is denoted by the arrow 7.

It can be seen that the cameras 5 and 6 each have a solid angle 8 and 9, respectively, that is of such a magnitude that each of said two solid angles 8 and 9, respectively, includes both the right-hand steering wheel 2 and the left-hand steering wheel 3.

The intersection 10 of the two solid angles 8 and 9 is shown shaded in FIG. 1.

It is thus possible to perform 3D-evaluation of the camera images, in the region of the intersection 10, using the two cameras 5, 6.

Figure 2:
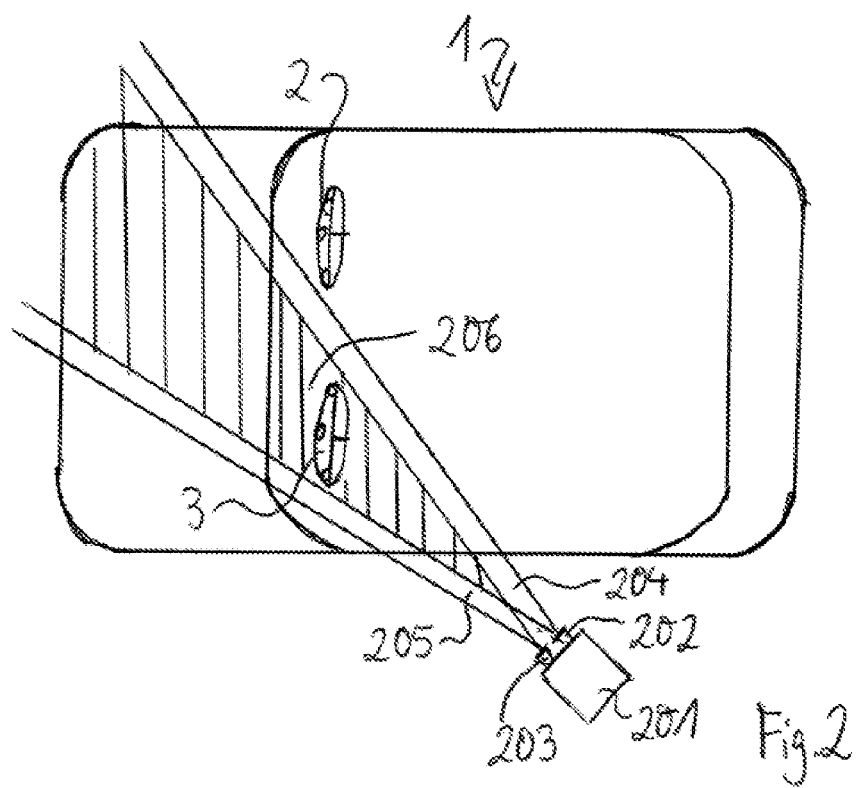
FIG. 2: is a plan view of a vehicle which is shown, in a schematic view, both as a right-hand drive and as a left-hand drive vehicle, comprising a second camera assembly.

FIG. 2 is a plan view of a vehicle which is shown, in a schematic view, both both with a steering wheel 2 at the right side (right-hand drive vehicle) and with a steering wheel 3 at the left vehicle side (left-hand drive vehicle), comprising a second camera assembly 201.

Said camera assembly 201 comprises two cameras 202 and 203 which each detect a solid angle 204 and 205, respectively. Said two solid angles 204 and 205 again have a common intersection 206 that is shown shaded.

It can be seen that the two solid angles 204 and 205 are arranged, with respect to the size and orientation thereof, such that the left-hand steering wheel 3 is located in said two solid angles and thus also in the intersection 206 of said two solid angles 204 and 205.

It is thus possible to detect said left-hand steering wheel 3 using the camera assembly 201.

The right-hand steering wheel 2 is located outside the solid angles 204 and 205.

In order for it to be possible to also detect the right-hand steering wheel 2, it would be possible to provide a second camera assembly (not shown here) that could be arranged on the right-hand side of the vehicle. Said camera assembly would likewise comprise two cameras. The solid angles of said cameras would enclose the right-hand steering wheel 2.

Alternatively, the camera assembly 201 could also be displaceable, for example so as to be movable on the right-hand side of the vehicle into a defined position and a defined orientation of the solid angles thereof such that the right-hand steering wheel 2 can be detected.

It would alternatively also be conceivable to design the camera assembly 201 so to be rotatable such that the solid angles thereof capture the right-hand steering wheel 2 as a result of the rotation.

Figure 3:
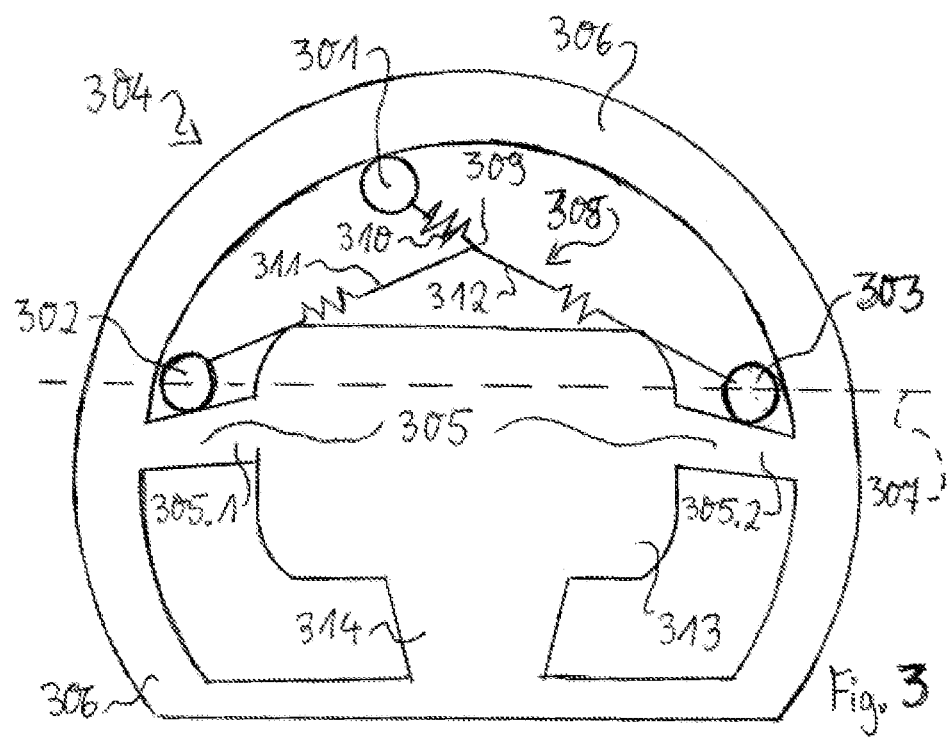
FIG. 3: is a first view showing the attachment of three reference objects to a steering wheel, in a plan view of the steering wheel.

FIG. 3 is a first view showing the attachment of three reference objects 301, 302, 303 to a steering wheel 304, in a plan view of the steering wheel. The three reference objects 301, 302, 303 can be releasably fastened to the steering wheel 304.

It is possible to determine the position of the three reference objects 301, 302, 303 in space, using a camera assembly consisting of two cameras. The plane in which said three reference objects 301, 302, 303 are is defined by the position of said three reference objects 301, 302, 303 in space. As a result, the plane of the steering wheel 304 is also defined, because the reference objects 301, 302, 303 are clearly fastened to the steering wheel 304 relative to said steering wheel plane.

It can be seen that two (302, 303) of the at least three reference objects 301, 302, 303 are in each case arranged in the region of the upper transition of a crosspiece 305 in the steering wheel 304 to the steering wheel rim 306, wherein one of said two reference objects 302 can be fastened on the left-hand side of the crosspiece 305 and the other of said two reference objects 303 can be fastened on the right-hand side of the crosspiece 305. The crosspiece 305 consists of the two parts 305.1 and 305.2, which each proceed from the circle 313 around the central shaft of the steering wheel 304.

Steering wheels 304 generally comprise a crosspiece 305 by means of which the steering wheel rim 306 is fastened to the central shaft of the steering wheel 304. Above said crosspiece 305, the steering wheel 304 is generally open towards the steering wheel rim 306. This makes it possible for the vehicle driver to keep the display elements, in the instrument cluster of the dashboard, in view in the event of a "straight position" of the steering wheel 304 or a small steering wheel angle. The steering wheels 304 optionally also have a connection element 314, from the central shaft of the steering wheel 304 downwards towards the steering wheel rim 306.

It can be seen that the steering wheel rim 306 does not extend in a circular manner on the lower face (in the straight position of the steering wheel 304), but instead cuts the (imaginary) circular continuation of the steering wheel rim 306 in the manner of a secant. It can also be seen that, owing to being attached above the crosspiece 305, the three reference objects 301, 302, 303 are not influenced by this geometrical shape of the steering wheel 304.

In the embodiment shown, the two reference objects 302, 303 are each attached at a defined point of the steering wheel 304. Furthermore, in the case of conventional steering wheels 304 said two points are axisymmetric with respect to a center line in the steering wheel plane, which line extends through the center point of the steering wheel 304, in the vertical direction (i.e. from the lowest point of the steering wheel rim to the uppermost point of the steering wheel rim).

This means that, in the case of an optimally adjusted steering wheel 304, the connecting line 307 of said two reference objects 302, 303 extends horizontally in the event of straight travel. The inclination of said connecting line 307 relative to the intersection lines resulting between a horizontal plane and the steering wheel plane determined by all three reference objects is the steering wheel angle.

This makes it possible to determine whether the steering wheel angle corresponds to the target value thereof. The steering wheel angle generally corresponds to the target value thereof when the connecting line 307 of the two reference objects 302, 303 corresponds extends horizontally in the event of a steering angle of the wheels of the vehicle that corresponds to straight travel.

During an evaluation of the two reference objects 302, 303 in conjunction with the third reference object 301, the plane of the steering wheel can be determined.

It can furthermore be seen that the three reference objects 301, 302, 303 are interconnected by means of a frame 308. The frame 308 consists of three longitudinal elements 310, 311, 312 that are interconnected, at a common center point 309, at one of the ends thereof. The reference objects 301, 302, 303 are in each case fastened at the other end of the longitudinal elements 310, 311, 312, such that the reference objects 301, 302, 303 can in this case be pushed in the longitudinal direction of the longitudinal elements 310, 311, 312. Said fastening can advantageously be resilient. A worker can thus easily fasten the frame 308, comprising the reference objects 301, 302, 303, to a steering wheel 304.

Since the two reference objects 302, 303 are each attached to the steering wheel at a defined position, the steering wheel angle can be determined from said two reference objects 302, 303, taking account of the third reference point 301. In order to further determine the position of the plane of the steering wheel 304, it is not necessary for the third reference object 301 to be attached to the steering wheel at a defined position. For this evaluation, said reference object 301 can for example also be attached so as to be offset relative to the axis of symmetry of the steering wheel, as can be seen in the drawing in FIG. 3.

This embodiment of the frame 308 comprising the resilient attachment of the reference objects 301, 302, 303 provides a simple possibility for achieving the releasable fastening of the three reference objects 301, 302, 303 to the steering wheel 304. The reference objects 301, 302, 303 can in addition also be shaped so as to be substantially cylindrical and so as to be mounted so as to be rotatable about the central axis of the cylinder. The lateral surface of the cylinder may correspond to the inner face of the inner portion of a torus that has been cut open in the manner of a circle.

Since the steering wheel rim is toroidal, a particular advantage of an embodiment of this kind is that the relevant reference object 301, 302, 303 is in contact with the steering wheel rim 306 at a defined position.

Even if the shape of the reference objects 301, 302, 303 is less optimally adapted to the geometrical shape of the steering wheel rim 306, the resilient mounting results in the reference objects 310, 302, 303 being pressed onto the steering wheel rim 306 in a defined manner.

It can furthermore be seen that the center point 309 of the frame 308 is located above the connecting line 307 of the two bottom reference objects 302, 303.

Geometrical constraints, resulting from the conventional design of steering wheels 304, can thus advantageously be taken into account. It is frequently the case in steering wheels that the crosspiece 305 does not extend exactly horizontally, but instead that the crosspiece 305 consists of two elements 305.1 and 305.2 which extends obliquely downwards, proceeding from the center point of the steering wheel 304. It is furthermore often the case that the center point of the steering wheel 304 is formed as a circle 313 in which for example the actuation element for the horn is integrated. The width of the crosspiece 305 is therefore often less than would correspond to the diameter of the circle 313 of the steering wheel 304 around the center point.

The described geometrical design and arrangement of the frame 308 makes it possible to take account of this, but wherein the two corresponding reference objects 302, 303 can nonetheless each be arranged in the region of the upper transition of the crosspiece 305.1, 305.2 in the steering wheel to the steering wheel rim 306.

In this embodiment, the frame 308 is advantageously spaced apart both from the crosspiece 305 and from the circle 313 around the center point of the steering wheel 304, such that the frame 308 (and thus also the reference objects 301, 302, 303) can be easily assembled and detached again.

Figure 4:
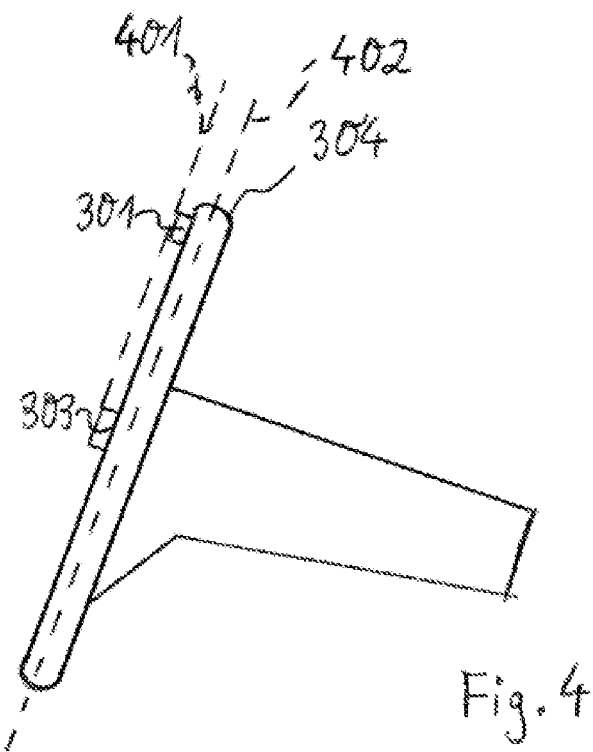
FIG. 4: is a further view showing the attachment of three reference objects to a steering wheel, in a side view of the steering wheel.

FIG. 4 is a further view showing the attachment of the reference objects 301, 303 to a steering wheel 304, in a side view of the steering wheel.

It can be seen in FIG. 4 that the reference objects 301, 303 (the reference object 302 is hidden in this case by the reference object 303 and cannot be seen, but is nonetheless present) span a plane 401 that is in parallel with the plane 402 of the steering wheel 304.

Owing to the adaptation to the basic structure of different types of steering wheel, the device can be used in a flexible manner. This is advantageous in particular also because various steering wheels exist that can be installed for the individual vehicle types, depending on the vehicle configuration. Owing to the adaptation of the device to the fundamental elements of the structure of the steering wheel, the device can be used in a flexible manner.

The reference objects are advantageously designed with respect to color (e.g. a pattern) and shape so as to provide the greatest possible contrast to the surroundings.

The inclination of the steering wheel and the steering wheel angle can be determined using image processing methods of photogrammetry.

Calibration of the system can take place either by means of a specific reference object arrangement having a defined pattern and a defined position, or by means of arranging the reference object arrangement in a defined position. The reference object arrangement relates to the arrangement of the three reference objects.

The invention claimed is:

1. A device for detecting the steering wheel position, the steering wheel angle and the inclination of the steering wheel of a vehicle,
characterized in that the device comprises at least two cameras to sense the steering wheel, wherein at least three reference objects are releasably fastened to the steering wheel,
characterized in that the device comprises a frame for the three reference objects, wherein the three reference objects are interconnected by means of the frame, wherein the frame consists of three longitudinal elements that are interconnected, at a common center point, at one of the ends thereof, wherein the reference objects are in each case resiliently fastened at the other end of the longitudinal elements, in order to push the reference objects in the longitudinal direction of the longitudinal elements.

2. The device according to claim 1,
characterized in that, the at least three reference objects are releasably fastened, wherein two of the at least three reference objects are fastened in the upper transition of a crosspiece in the steering wheel to the steering wheel rim of the steering wheel or at a defined distance to this transition with a defined direction to this transition, wherein one of said two reference objects is configured to-be fastened on the left-hand side of the crosspiece of the steering wheel and the other of said two reference objects can be fastened on the right-hand side of the crosspiece of the steering wheel, wherein said two reference objects can be distinguished from the at least one further reference object.

3. The device according to claim 2,
characterized in that reference aids are part of the device, which are configured in such a way that in the mounted state, they are arranged outside the periphery of the steering wheel and which are in each case associated with one of the two reference objects, which are configured to in each case be fastened in the upper transition of a crosspiece in the steering wheel to the steering wheel rim of the steering wheel or at a defined distance to this transition, such that the connecting line between the two reference aids coincides with or extends in parallel with the connecting line of the two reference objects mentioned.

4. The device according to claim 1,
characterized in that, when the three reference objects are fastened to the steering wheel, the center point of the frame is located above the connecting line of the two bottom reference objects.

5. The device according to claim 1,
characterized in that the two cameras are arranged on the same side of the vehicle, outside the vehicle.

6. The device according to claim 5,
characterized in that each of the two cameras in each case has a solid angle that allows for a steering wheel to be detected by both cameras, either on the right-hand side of the vehicle or on the left-hand side of the vehicle, wherein both cameras detect the same steering wheel.

7. The device according to claim 1,
characterized in that the two cameras are arranged on different sides of the vehicle, wherein each of the two cameras in each case has a solid angle that allows for a steering wheel to be detected by both cameras, both on the right-hand side of the vehicle and on the left-hand side of the vehicle.

8. A method comprising:
detecting the steering wheel position, the steering wheel angle and the inclination of the steering wheel of a vehicle,
characterized in that at least two cameras sense the steering wheel, by detecting at least three reference points on the steering wheel.

* * * * *